Dec. 22, 1964 W. H. SCIDMORE 3,162,715
MECHANISM FOR CHANGING MAGNIFICATION OF A BINOCULAR PERISCOPE
Filed Oct. 2, 1961 3 Sheets-Sheet 2
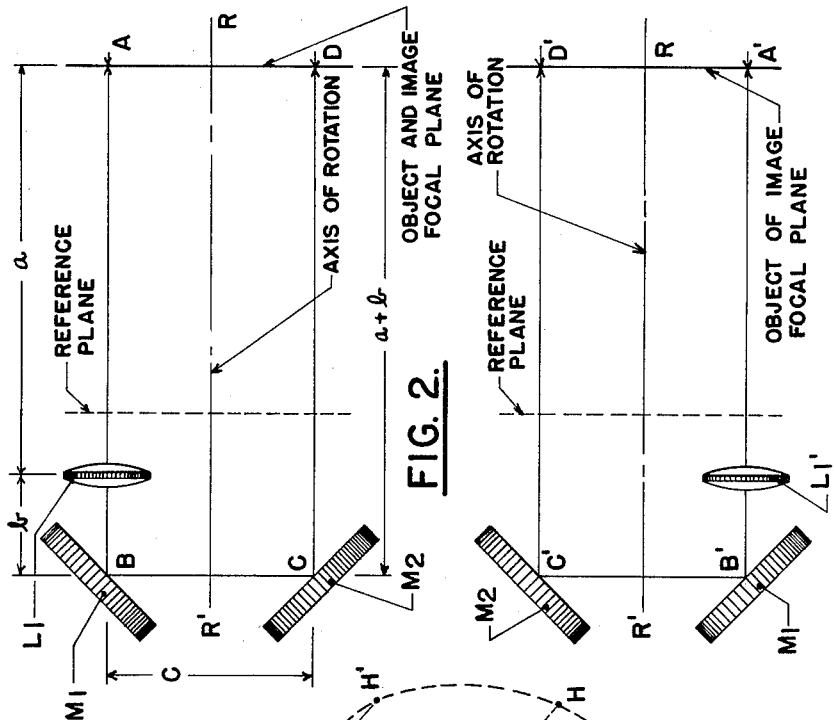
FIG. 2.
FIG. 3.
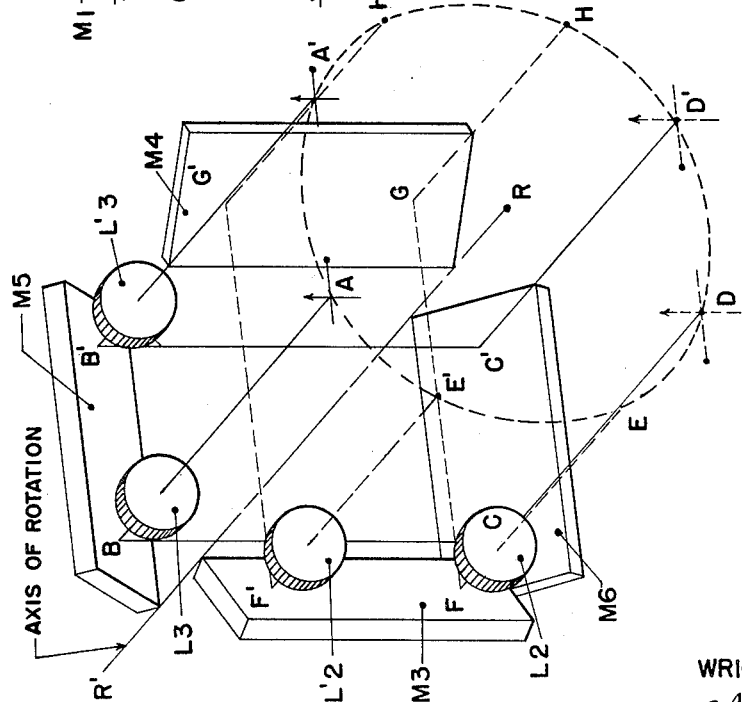
FIG. 8.
INVENTOR.
WRIGHT H. SCIDMORE
BY
ATTORNEYS:

Dec. 22, 1964 W. H. SCIDMORE 3,162,715
MECHANISM FOR CHANGING MAGNIFICATION OF A BINOCULAR PERISCOPE
Filed Oct. 2, 1961 3 Sheets-Sheet 3
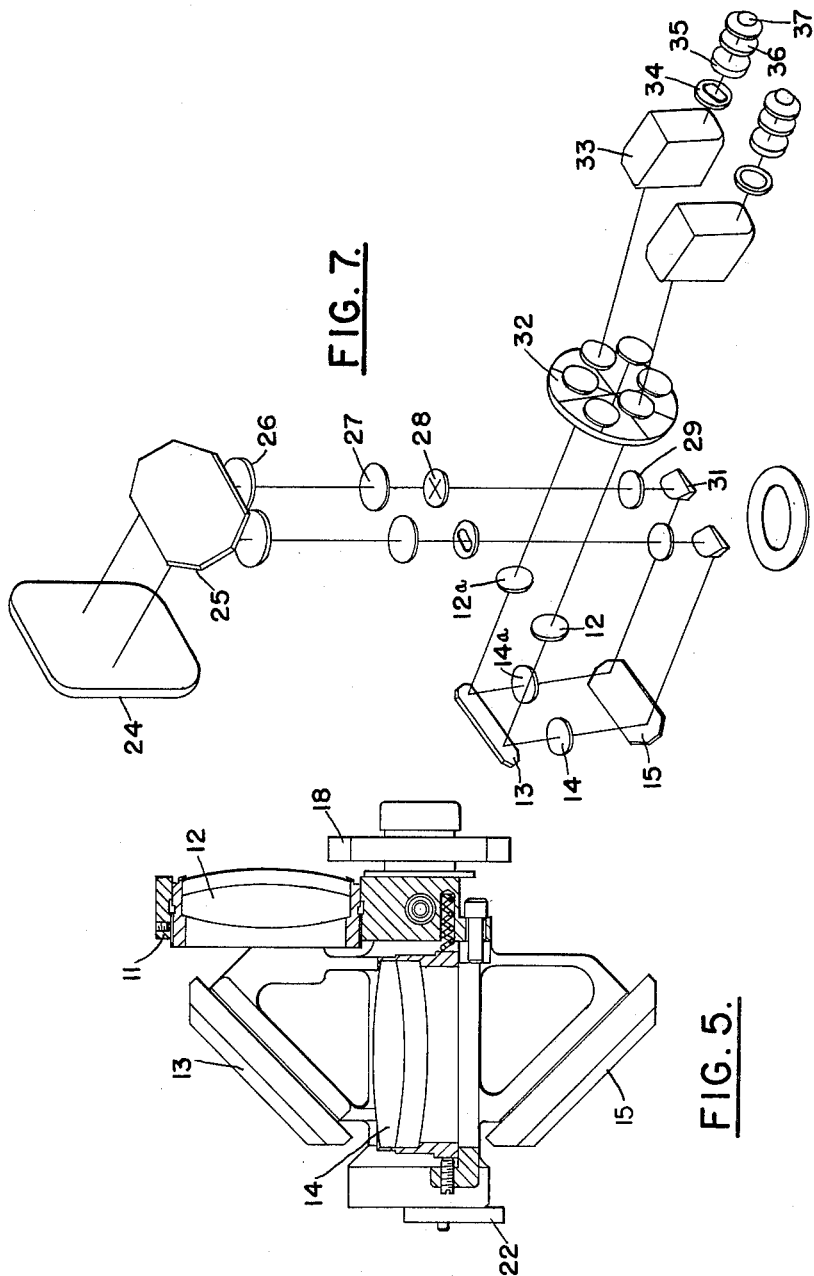
INVENTOR.
WRIGHT H. SCIDMORE

United States Patent Office 3,162,715
Patented Dec. 22, 1964

3,162,715
MECHANISM FOR CHANGING MAGNIFICATION OF A BINOCULAR PERISCOPE
Wright H. Scidmore, Langhorne, Pa., assignor to the United States of America as represented by the Secretary of the Army
Filed Oct. 2, 1961, Ser. No. 142,449
5 Claims. (Cl. 88—72)
(Granted under Title 35, U.S. Code (1952), sec. 266)

The invention described herein may be manufactured and used by or for the Government for governmental purposes without the payment to me of any royalty thereon.

The present invention relates to a magnification assembly for use in a sealed binocular observation instrument, and more particularly to a magnification assembly consisting of a rotatable unit providing internal selective magnification.

In prior optical instruments, magnification has been varied by the use of moveable Galilean telescopes, interchangeable eyepieces, or the insertion, replacement and translation of one or more of the lens components comprising the objective or the lens erecting system to change the focal length of the lens system preceding the eyepieces. Vari-focal or zoom type lens systems fall into this latter category.

The use of a barrel or disk assembly containing two Galilean telescopes results in a much larger and heavier magnification assembly and instrument. Furthermore, if located in front of the objective lenses this assembly has the following disadvantages:

(1) It is susceptible to introduction of sighting error upon changing magnification since the retention of target reticle relationship is dependent upon the precison of the indexing mechanism.

(2) The angular subtense of markings comprising the reticle pattern is different for the two magnifications.

(3) The height of the center of gravity of a periscope instrument is raised resulting in a reduction in mounting stability of the instrument.

The disadvantages of using interchangeable eyepieces as the means for changing magnification include the requirement for carrying and storing two additional eyepieces, the inability to completely seal the instrument since the eyepiece change cannot properly be effected internally, and the increase in time required to effect a change in magnification.

Disadvantages common to schemes employing the insertion, replacement or translation of lens elements to effect a change in magnification are the increases in size, weight and complexity of the instrument. Most schemes in this category do not have a high degree of inherent stability for retention of binocular collimation under the extreme conditions encountered in field use and would therefore depend to a greater extent upon ruggedness of mechanical construction for stability. Devices in this general category which involve lens components in the objective prior to the reticle have the further disadvantages mentioned above with respect to the Galilean telescope.

The present invention consists of a folded lens erecting system for a binocular instrument which is rotatably mounted about an axis parallel to the incident and emerging optical axes, so that the left erecting lenses may be transferred into the right optical train and the right erecting lenses may be transferred in the left optical train by rotating the system. Essentially, a translation of the lens erecting systems along their optical axes to their conjugate positions occurs, effecting a change in the magnification of the system.

An object of the present invention is the provision of a light-weight compact hermetically sealed binocular observation instrument with selective magnification.

Another object is to provide retention of binocular collimation in a binocular instrument.

Still another object is to provide retention of angular subtense of reticle markings in a binocular instrument.

A further object is to provide an internal magnification assembly which provides selective magnification, without the interchange of parts, and with great speed.

Other objects and advantages of the invention will hereinafter become more fully apparent from the following description of the annexed drawings, which illustrate a preferred embodiment, and wherein:

FIGS. 2 and 3 are diagrammatic optical schematics of the magnification assembly 180° out of phase, oriented for maximum and minimum magnification respectively;

FIG. 4 is a plan view of preferred embodiment of the magnification assembly;

FIG. 5 shows a view, partly in section, of the assembly taken on the line 5—5 of FIG. 4 looking in the direction of the arrows;

FIG. 6 shows a section of the assembly taken on the line 6—6 of FIG. 4 looking in the direction of the arrows;

FIG. 7 is an optical schematic of a lens system employing the instant invention;

FIG. 8 is a diagrammatic optical schematic in perspective of a modification of the magnification assembly wherein selective magnification of four powers may be obtained.

Figure 1:
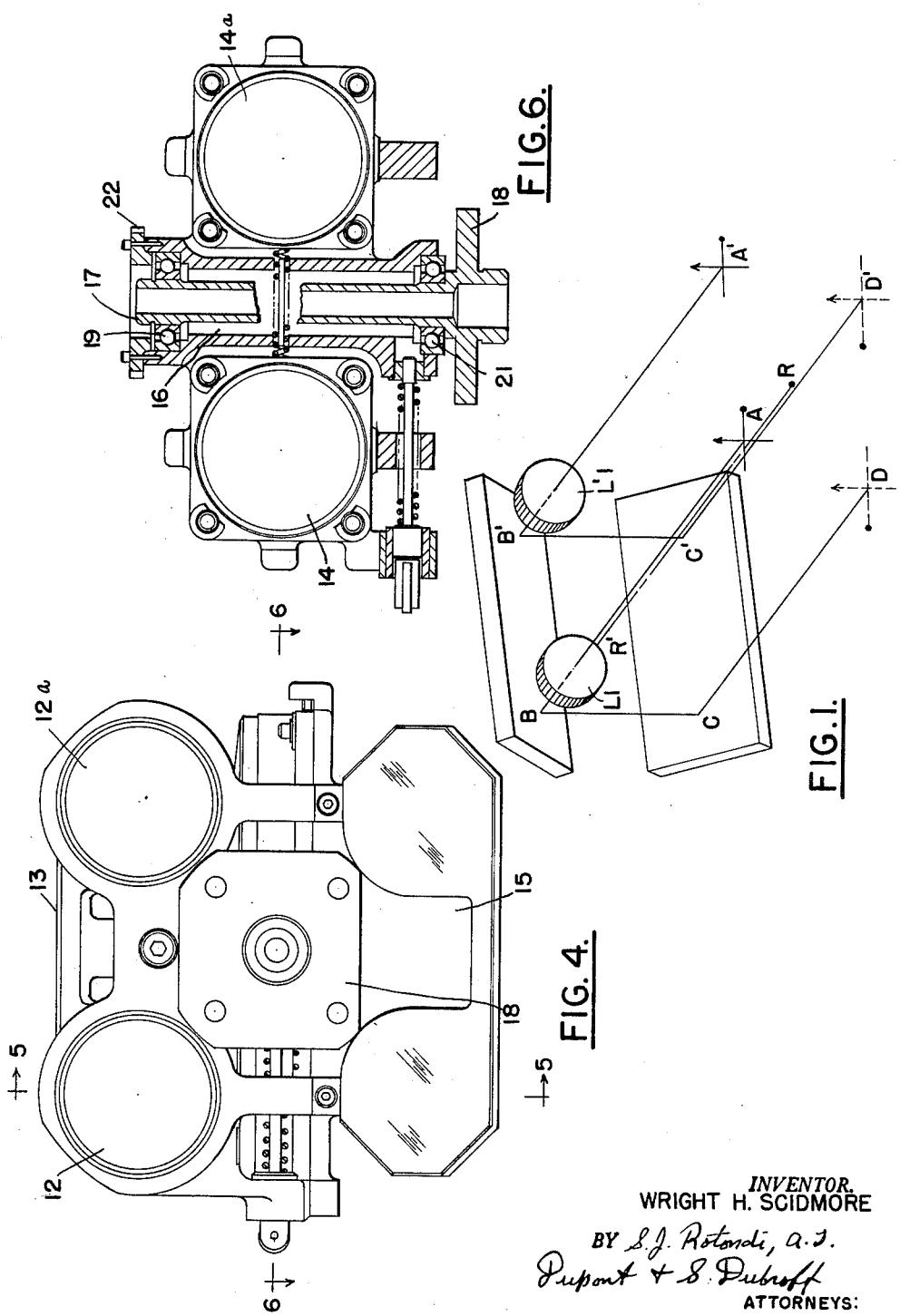
FIG. 1 is a diagrammatic optical schematic in perspective of the magnification assembly.

Referring to the drawings, there is shown in FIGS. 1 and 2 objects A and A′ lying in a plane AA′ DD′ which is perpendicular to an axis of rotation RR′. Light rays from these objects are imaged by the erecting lenses $L_1$ and $L_1'$ into the same plane AA′ DD′ at points D and D′ after first being deviated 180° and displaced a distance "C" by reflections from the two mirrors $M_1$ and $M_2$. The erecting system is oriented for maximum magnification ($M_H$). The magnification of this system is the ratio of the image distance $(a+2b+c)$ to the object distance $(a)$ which reduces to:

$$M_H = 1 + \frac{(2b+c)}{a}$$

FIGURE 3 shows the magnification assembly rotated 180° from the view shown in FIG. 2 about the axis of rotation RR′, such that optical axes C′D′ and A′B′ are relocated to the position formerly occupied by axes AB and DC, and vice versa. The distances of the object and image from the erecting lens have interchanged, effectively placing object and image at their conjugate focal positions, thereby retaining system focus while effecting a change in magnification. The system is now oriented for minimum magnification ($M_L$) which is equal to the reciprocal of the maximum magnification ($M_H$).

$$M_L = \frac{1}{M_H}$$

The ratio of the maximum to minimum magnification is therefore equal to the square of the maximum magnification.

$$\frac{M_H}{M_L} = (M_H)^2$$

It is expected that this principle could be advantageously employed for ratios between 1.2 and 10.0; in certain cases tele-photo and/or reverse telephoto lenses could be used to obtain a desired ratio of maximum to minimum magnification while satisfying space requirements for location of optical components.

The left and right object and image planes do not necessarily have to lie in a single plane as shown in FIGS. 1, 2 and 3, as various prisms and lenses can be used to change the actual length and configuration of the optical axes between the four individual focal planes and the reference plane (which plane is perpendicular to the incident and emerging optical axes and separates the fixed portion of the instrument from the rotating member). It is necessary, however, that the equivalent distance in air from the reference plane to each of the four focal planes be equal in order to maintain focus for both the left and right optical systems when changing magnifications.

A specific embodiment of the magnification assembly shown in FIGS. 4, 5 and 6 provides a change in magnification from $\sqrt{2}/2$ to $\sqrt{2}$ power. A support bracket 11 has attached thereto a first erecting lens 12, a first mirror 13, a second left erecting lens 14 and a second mirror 15, said components having a common optical axis. To complete the optical design of this assembly there is a first right erecting lens 12A and a second right erecting lens 14A having a common axis.

Mirrors 13 and 15 are also components along this latter axis. For convenience, one or both of these mirrors may be replaced by two smaller mirrors, each of which will be placed along one of the aforementioned axes. A cylindrical bore 16 runs through the bracket substantially parallel to the incident and emerging optical axes, and is adapted to receive a spindle 17 having a face plate 18 on an end thereof for mounting in a binocular instrument. Ball bearings 19 and 21 are provided at both ends of the cylindrical bore to insure smooth rotation of the bracket 11 about the spindle 17. The axis of the spindle is the axis of rotation for the entire magnification assembly. A gear segment 22 is fixed to the bracket at the outer end of the cylindrical bore for conveying rotational movement to the magnification assembly.

For this particular assembly, erecting lenses 12 and 12A are cemented doublets having a surface facing mirror 13 with radius 3.684, an opposite surface with radius −8.605 and cemented surfaces with radius −2.798. The lenses have a diameter of approximately 1.350, and axial thickness of about 0.410 and an equivalent focal length of about 6.187. Back focal length is about 5.987. (Dimensions are given in inches.)

Erecting lenses 14 and 14A are also cemented doublets with surface facing mirror 13 having a radious of +5.455, an opposite surface with radius −3.508 and cemented surface with radius −12.701. The diameter of the doublet is about 1.450 and the axial thickness is approximately 0.375; the lenses having equivalent focal lengths of about 8.751, and back focal lengths of about 8.573.

Mirrors 13 and 15 are surface reflecting, and are positioned at an angle of about 45° to the lenses, whereby their effect is to fold entering light rays about 180°.

These mirrors and lenses are securely attached to the common support bracket 11 to insure retention of alignment and binocular collimation when the instrument is subjected to shock, vibration, and various climatic conditions which are encountered in normal field use.

The magnification assembly is mounted in a binocular instrument beyond the reticle so that light rays from an object are directed therein. To change the magnification of the instrument, one has only to rotate the magnification assembly 180°.

An optical system that might be found in a binocular instrument is shown in FIG. 7 along with the instant invention. The instrument represented is a binocular periscope and has at an end a window 24 through which light rays from the object enter. The rays are directed to head mirror 25 which reflects them through, in the right optical train, objective lenses 26 and 27, reticle 28, collective lens 29, prism 31 and the magnification assembly oriented for minimum magnificant starting with mirror 15 and thence to erecting lens 14A, mirror 13 and erecting lens 12A whereupon the rays pass through a filter 32, rhomboid prism 33, diaphragm 34, field lens 35, center lens 36 and eye lens 37.

As shown in FIG. 1, the magnification assembly is rotatable as a unit, about axis RR′ which is substantially parallel to the incident and emerging optical axes thereof. Means external a hermetically sealed unit containing the instant invention, cooperate with gear segment 22 to effect the rotation.

The magnification assembly gives rise to many important advantages:

(1) Retention of correct sighting reference when the magnification is changed because this magnification assembly permits of placement beyond the instrument reticle.

(2) Correct angular subtense of reticle pattern for all magnifications for reasons mentioned in "1" above.

(3) Identical magnification of left and right optical trains for all power positions without recourse to selective assembly of components comprising the magnification assembly.

(4) Reduction in weight resulting from a combination of factors including:

(a) The inherent stability of the basic concept for retention of binocular collimation permitting use of lightweight materials and thin walled construction for the magnification assembly and the upper portion of the instrument (periscope).

(b) Inherent low center of gravity of the instrument, providing mounting stability with no extra weight built into the instrument base.

(c) Use of smaller components permitted by magnification system being adapted to function properly in that portion of the optical system requiring relatively small aperture components.

Under certain conditions, it might be desirable to provide for more than two magnifications, as shown in FIG. 8. Although the basic device herein disclosed provides for internal selective magnification of only two powers, the number of different magnifications can be increased in increments of two for each additional pair of lens erecting systems incorporated in the rotating member of the magnification assembly. The same basic considerations discussed for the system providing two magnifications apply except that, in this case, a change in magnification is effected by each 90° rotation of the assembly.

Mirrors M3 and M4, and lenses L2 and L2′ form a system yielding 2 powers of magnification. Mirrors M5 and M6 and lenses L3 and L3′ form a second system providing 2 powers of magnification. Attached to a common rotatable bracket, these components are capable of providing 4 different powers. Each 90° rotation of the assembly serves to replace that pair of lens erecting systems which were in the optical path of the instrument with the pair which were previously not in this path, and vice versa. If the maximum magnification of each system is equal to $M_H$ and $N_H$ respectively, it is evident that the corresponding minimum magnifications are $1/M_H$ and $1/N_H$ and that the ratios of maximum to minimum magnifications are $M_H^2$ and $N_H^2$.

One pair of mirrors, if desired, can be displaced longitudinally in a direction parallel to the magnification axis of rotation as depicted by mirrors M5 and M6 in FIG. 8. A displacement of this nature might be desirable to further reduce the size of the assembly or to obtain a desired ratio of maximum to minimum magnification with minimum overall complexity.

The mirrors employed in the magnification assembly to fold the lens erecting systems could be permanently mounted to a fixed portion of an instrument. Here of course, one could not locate a lens element between the mirrors as was done in FIGS. 4, 5 and 6. The lenses would be mounted in a common lens barrel to provide stability for the retention of binocular collimation.

For certain applications, it would be desirable to use incident and emerging optical axes which are inclined at some given angle with respect to one another. In this case, the axis of rotation would be that line which is symmetrically disposed with respect to the four axes. It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

I claim:

1. An optical system for an hermetically sealed binocular periscope with selective magnification having a window for receiving light, a head mirror at an angle thereto for reflecting said light, a reticle, means for focusing said light in the plane of the reticle, collective lenses, means for deviating said light from said collective lenses into a selective magnification assembly having a magnification M and comprising a first mirror, a first pair of erecting lenses, a second mirror and a second pair of erecting lenses, said mirrors acting to fold the incident optical axis approximately 180°, whereby an emergence optical axis is parallel thereto, said magnification assembly being fixedly mounted upon a shaft rotatable about an axis parallel to said incident and emergence optical axes and equidistant therebetween, means exterior said hermetically sealed binocular periscope for rotating said shaft whereby rotation of said shaft of 180° rotates the magnification assembly 180° effectively translating the lens erecting systems to their conjugate positions giving said magnification assembly a magnification of $1/M$, and means for adjusting said light for visual observation.

2. In combination with a hermetically sealed binocular periscope, a pair of internal folded lens erecting systems for varying the magnification comprising a first pair of erecting lenses perpendicular to the incident optical axes, a first reflecting means beyond said lenses and at a 45° angle thereto, a second pair of erecting lenses at a 45° angle with said reflecting means to intercept reflections therefrom, a second reflecting means beyond said second pair of erecting lenses whereby the emerging optical axis is rendered parallel to said incident optical axis, said lenses and reflecting means being mounted on a rotatable shaft which is parallel to the incident and emerging optical axes, and external means for rotating said shaft, whereby a rotation of said shaft 180° will effect, essentially, a translation of the lens erecting systems along their optical axes to their conjugate positions and produce a change in magnification of said lens erecting system from M to $1/M$.

3. An optical device for an hermetically sealed binocular optical system for providing selective magnification comprising a first pair of erecting lenses exposed to entering light, reflecting means to deviate said light from said pair of erecting lenses through a second pair of erecting lenses, a second reflecting means to deviate said light so that the optical axes thereof are substantially parallel to the optical axes of said entering light, a bracket to which said reflecting means and said erecting lenses are rigidly mounted, means by which said bracket may be rotated about an axis which is substantially parallel to the incident and emerging optical axes and equidistant therefrom, whereby rotation of the bracket 180° changes the magnification of the device from M to $1/M$ by transferring the erecting lenses along their optical axes to their conjugate positions.

4. In a hermetically sealed binocular theodolite having a periscopic optical system, means for internally varying the magnification thereof comprising a pair of folded lens erecting systems having parallel incident and emerging optical axes, said lens erecting systems being fixedly mounted on a shaft rotatable about an axis parallel to said incident and emerging optical axes, and external means cooperating with said shaft for producing rotation thereof, whereby rotation of said shaft 180° represents essentially a translation of the folded lens erecting systems along their optical axes to their conjugate positions effecting a change in magnification from M to $1/M$ power.

5. In combination with a hermetically sealed binocular periscope having an optical system internal means for providing 4 different magnifications comprising 2 pairs of folded lens erecting systems mounted on a shaft, said shaft being rotatable about an axis in the plane formed by the incident and emerging optical axes and equidistant therebetween said pairs of folded lens erecting systems being displaced by an angle of 90°, an external regulating knob, means cooperating with said knob and said shaft to effect rotation of said shaft when said knob is rotated, one of said pairs of folded lens erecting systems always being part of the optical system of the periscope, whereby a rotation of the shaft 90° presents a second pair of folded lens erecting systems to the optical system, a rotation of 180° effects essentially a translation of the first pair of lens erecting systems along their optical axes to their conjugate positions, and a rotation of 270 degrees effectively places said second pair of lens erecting systems in their conjugate positions, each of which positions of said shaft effecting a different power of magnification.

References Cited by the Examiner

UNITED STATES PATENTS

| 1,236,722 | 8/17 | Lange | 88—32 |
| 2,284,757 | 6/42 | Morton | 88—72 |
| 2,889,743 | 6/59 | Rabben | 88—39 X |
| 2,963,942 | 12/60 | Montremy | 88—72 X |

JEWELL H. PEDERSEN, *Primary Examiner.*